United States Patent [19]

Hara et al.

[11] 4,232,385

[45] Nov. 4, 1980

[54] FREQUENCY DIVISION MULTIPLEXING SYSTEM FOR OPTICAL TRANSMISSION OF BROADBAND SIGNALS

[75] Inventors: Elmer H. Hara, Ottawa, Canada; Takeshi Ozeki, Tokyo, Japan

[73] Assignee: Her Majesty the Queen in right of Canada, as represented by the Minister of National Defence, Ottawa, Canada

[21] Appl. No.: 922,715

[22] Filed: Jul. 7, 1978

[30] Foreign Application Priority Data

Jul. 12, 1977 [CA] Canada ............................. 282545

[51] Int. Cl.³ ............................................... H04B 9/00
[52] U.S. Cl. ..................................... 370/3; 350/96.15; 455/610
[58] Field of Search ............. 250/199; 350/96.15, 350/96.16, 96.19, 96.21; 370/3; 455/610, 612

[56] References Cited

U.S. PATENT DOCUMENTS

| | | | |
|---|---|---|---|
| 1,981,999 | 11/1934 | French | 350/96.19 |
| 2,506,672 | 5/1950 | Kell et al. | 250/199 |
| 3,566,127 | 2/1971 | Hafner | 250/199 |
| 3,590,248 | 6/1971 | Chatterton, Jr. | 250/199 |
| 3,908,121 | 9/1975 | Riseberg et al. | 250/199 |
| 3,953,727 | 4/1976 | d'Auria et al. | 250/199 |
| 4,061,577 | 12/1977 | Bell | 250/199 |

FOREIGN PATENT DOCUMENTS

2516975 10/1976 Fed. Rep. of Germany ........ 350/96.15

OTHER PUBLICATIONS

Bedgood et al.–Demountable Connectors for Optical Fiber Systems Elec. Comm., vol. 51, #2, pp. 85–91, Apr.–Jun. 1976.
Ozeki et al.–Pulse Mod. of DH (GaAl) as Lasers.–IEEE Jour. of Quantum Elec., vol. QE 9, #2, Feb. 1973.

*Primary Examiner*—Robert L. Griffin
*Assistant Examiner*—Joseph A. Orsino, Jr.
*Attorney, Agent, or Firm*—Nathan Edelberg; Jeremiah G. Murray; Edward Goldberg

[57] ABSTRACT

The present invention relates to a frequency division multiplex system for transmitting a plurality of radio frequency signals of differing frequencies from a transmission station to a receiving station. The system is comprised of a plurality of modulated light sources in the transmission station, each providing a light signal. A major optical fiber unit joins the transmission station with the receiving station for transmitting a mixed light signal comprised of the light signals from each light source. A plurality of minor optical fiber units are provided, each connecting one of the light sources to the major optical fiber. A photodetector is located in the receiver station. The detector is operatively associated with the major optical fiber for detecting the radio frequency signals from the mixed light signal.

9 Claims, 4 Drawing Figures

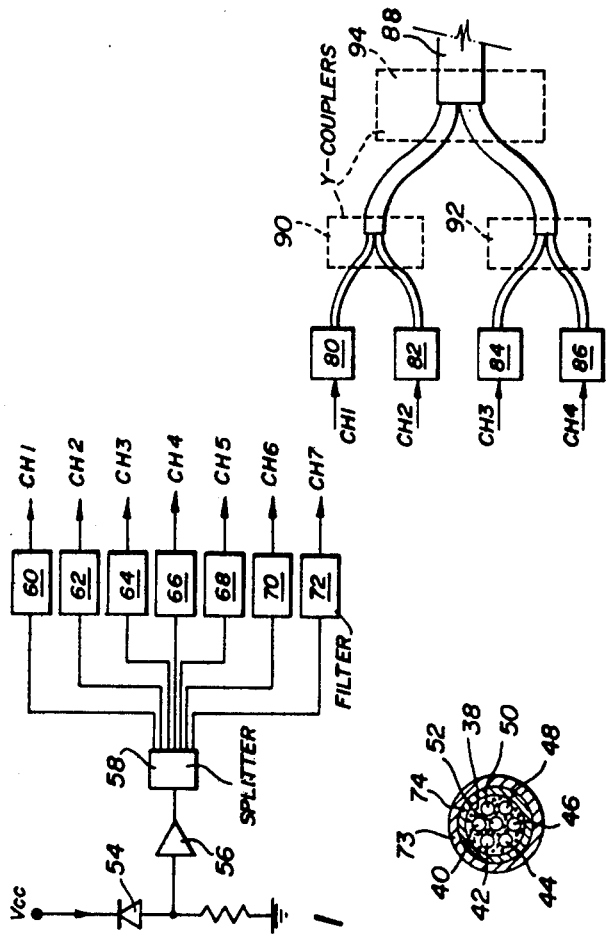
FIG. 1
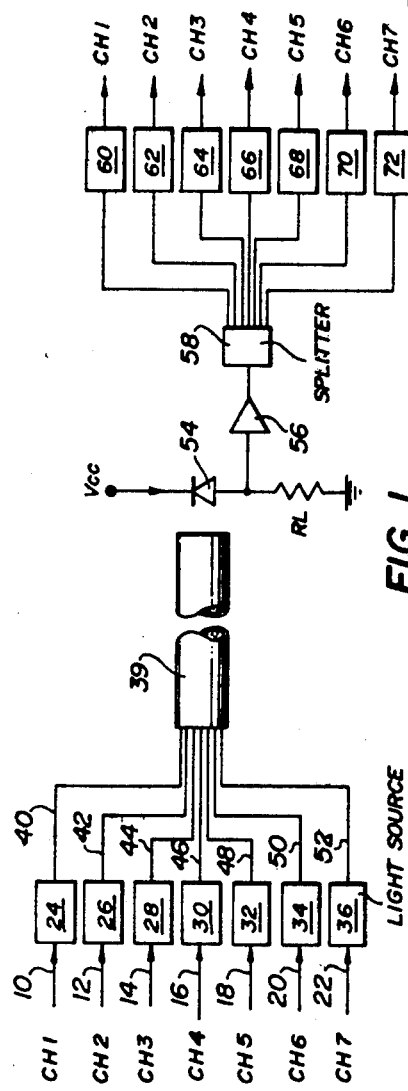
FIG. 2
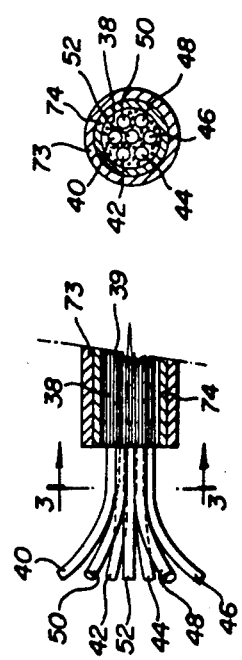
FIG. 3
FIG. 4

FREQUENCY DIVISION MULTIPLEXING SYSTEM FOR OPTICAL TRANSMISSION OF BROADBAND SIGNALS

BACKGROUND OF THE INVENTION

1. Field of the Invention

The present invention relates to a frequency division multiplexing system for the optical transmission of broadband signals.

2. Description of the Prior Art

It has been known in the past to employ frequency division multiplexing to transmit a plurality of signals down a single optical fiber. However, these signals have all been modulated onto a single light source. Those light sources for optical communications systems have nonlinear response characteristics which produce harmonic cross modulation and intermodulation distortion which limit the quality of a received signal. This degradation can be reduced by lightly modulating the light source so that it operates in a more linear fashion. Unfortunately, when an attempt is made to lightly modulate the single light source with a plurality of RF signals, the effective signal power per signal is small and a good signal-to-noise ratio cannot be obtained over transmission distances where there is any great signal attenuation.

This poor signal-to-noise ratio is further aggravated when a plurality of television channels are to be transmitted from a single modulated light source. These broadband signals share the available total optical output of the light source. As a result, the optical power per unit bandwidth is very low for a plurality of broadband signals.

This problem could be solved if a single light source were to be maintained by improving the linear response characteristics of the light source so that a large modulation factor could be used. Unfortunately, if an attempt is made to improve the linear response characteristics of a typical light source such as a light emitting diode (LED) or double heterostructure (DH) laser by suitable alteration of the chemical composition or physical structure of the light source, the optical output power is usually adversely affected. If an attempt to remedy this situation is made by further modification of the chemical composition or physical structure of the light source in order to increase the optical output power, the frequency response of the light source is in turn adversely affected and renders the light source unsuitable for use in a broadband system required in the transmission of a plurality of television signals. In other words, the simultaneous optimization of linear response characteristics, optical output power and frequency response is extremely difficult to achieve in light sources such as the LED or DH laser.

SUMMARY OF THE INVENTION

The present invention contemplates the use of a plurality of light sources, each intensity modulated with, for example, a television signal of a different channel. The various light sources are then channeled into a single optical-fiber cable for transmission. There is no need to keep these light paths physically separated since each light signal is modulated by a signal of a different radio frequency band. The electronic television signals may be retrieved at the receiver end of the single optical-fiber cable by detection with a photosensitive device such as photodiode or photomultiplier tube. The individual light sources are connected to the main optical-fiber cable by smaller optical fibers that are merely butt-jointed to the large cable or interconnected by a series of Y-couplers. Each light source can be modulated at a modulation factor which is sufficient to provide a good signal-to-noise ratio and at a level which is in a fairly linear operating range of the light source.

Since each light source is modulated with only one RF TV band and then all of the light sources are combined, the optical power per unit bandwidth is higher than in the situation were a single light source of similar characteristics is modulated by a plurality of RF TV bands while maintaining the same overall modulation factor as in the case where a plurality of light sources is employed.

It is accordingly an object of a particular embodiment of the present invention to provide a multichannel frequency division multiplexing system which has a reduced harmonic cross modulation and intermodulation distortion and an improved signal-to-noise ratio.

It is a further object of an embodiment of the present invention to provide a frequency division multiplex system wherein a plurality of light sources are each modulated by a frequency band signal and then each so modulated light source is combined to form a single beam containing a mixture of all the modulated light sources.

According to one aspect of the present invention there is provided a frequency division multiplex system for transmitting a plurality of radio frequency signals of different frequencies from a transmitter station to a receiver station. The system is comprised of a plurality of modulated light sources in said transmitter station, each providing a light signal; a major optical-fiber means joining the transmitter station with the receiver station for transmitting a mixed light signal comprised of the light signals from each light source; A plurality of minor optical-fiber means each connecting one of said light sources to said major optical-fiber means; and detector means, located in said receiver station and operatively associated with said major optical-fiber means, for detecting said radio frequency signals from the mixed light source.

BRIEF DESCRIPTION OF THE DRAWINGS

In the drawings which illustrate embodiments of the invention,

FIG. 1 is a schematic diagram of a seven channel transmitting and receiving system;

FIG. 2 is an enlarged partially schematic plan view of a coupling shown in FIG. 1;

FIG. 3 is a cross sectional view taken along line 3—3 in FIG. 2; and

FIG. 4 is an alternative embodiment of the present invention which shows a four channel combining network.

DESCRIPTION OF THE PREFERRED EMBODIMENTS

Referring to FIG. 1, RF signals of seven TV channels are fed on lines 10, 12, 14, 16, 18, 20 and 22 into seven light sources 24, 26, 28, 30, 32, 34 and 36. Each RF signal for each channel is comprised of the appropriate RF carrier frequency modulated with video and aural information. Therefore, each RF channel has a bandwidth of approximately 6 MHz.

Modulated light sources 24, 26, 28, 30, 32, 34 and 36 may be DH lasers or Burrus-type light emitting diodes.

The modulated light information from each of the light sources 24, 26, 28, 30, 32, 34 and 36 is fed to a main optical-fiber cable 39 via sub-optical-fiber cables 40, 42, 44, 46, 48, 50 and 52.

Modern optical-fiber cables have a transmission loss which is approximately equal to or better than the loss of an ordinary electronic transmission cable. As a result, the main optical-fiber cable 39 can be of a relatively long length.

At the receiving end of this system, a photosensitive diode 54, appropriately biased via voltage $V_{cc}$ and load resistor $R_L$ is operatively associated with the end of the optical-fiber cable 39. The electrical output of diode 54 is a mixture of all of the frequency modulated signals which originally modulated light sources 24, 26, 28, 30, 32, 34 and 36 in the transmission end of the system.

This composite signal can be amplified by broadband amplifier 56. The output of the amplifier feeds a power splitter 58. The seven TV channel signals are then separated from each other by filters 60, 62, 64, 66, 68, 70 and 72.

This embodiment shows how seven TV channels can be transmitted over relatively long distances via a single optical-fiber cable. The number of transmitted TV channels is however not limited to seven and can be many more as long as all of the sub-optical-fiber cables from many light sources can be joined satisfactorily to the main optical-fiber cable 39.

FIGS. 2 and 3 are partial sectional views of a typical coupling made between the main optical-fiber cable 39 and sub-optical-fiber cables 40, 42, 44, 46, 48, 50 and 52. The sub-optical-fiber cable ends are merely butt-jointed against the end of main optical-fiber cable 39 which consists of a core 38, cladding 74 and jacket 73. The sub-optical-fiber cables are held in position by suitable mechanical means. Adhesives such as epoxy cement may be used for this purpose or alternatively, the entire joint can be fused together by application of heat to form a solid connection. The region of the butt joint may contain a matching oil which matches the index of refraction of the sub-optical-fiber cables to the main optical-fiber cable.

The main optical-fiber cable 39 need not be restricted to a single fiber design as shown in FIGS. 1 and 2, but may also be a bundle of suitable optical-fibers which offers a larger joining area for the sub-optical-fiber cables.

FIG. 4 shows an alternative embodiment for connecting light sources to a main cable. In this embodiment only four TV channels are shown. However, any number of TV channels could be connected using the techniques shown in FIG. 4. Modulated light sources 80, 82, 84 and 86 are connected to the main optical-fiber cable 88 via three Y-couplers 90, 92, and 94. Each Y-coupler has two inputs and an output. Pairs of light sources are connected to the input of the Y-couplers with the outputs of pairs of Y-couplers in turn being connected to the inputs of other Y-couplers.

Here again minor optical-fiber cables are merely butt-jointed against larger, major optical-fiber cables until finally two cables are butt-jointed against the end of the major fiber optic cable 88.

FIG. 4 shows an even number of light sources being connected together. However, odd numbers of sources can be connected by merely connecting the output of the odd numbered light source to a second ranking Y-coupler, the other input of which is connected to the output of a first ranking Y-coupler.

The scheme outlined in FIG. 4 may also be reproduced entirely or partly as an integrated optical element where the modulated light sources 80, 82, 84 and 86 are fabricated in or on a common substrate and the Y-couplers are formed by optical waveguides produced in or on the substrate by known integrated optical fabrication techniques. In such a design, a single waveguide from the last Y-coupler can be connected to the main optical-fiber cable 88 by, for example, a butt-joint.

In FIGS. 1 and 4, seven channels and four channels have been shown as being interconnected. However, it should be understood that the present invention is not limited to the interconnection of these particular numbers of channels. In fact, any number of channels can be interconnected. The limitation of the number of channel connections is limited mainly by the frequency response of the light sources and photodetector and associated electronic components.

What is claimed is:

1. A frequency division multiplex system for transmitting a plurality of radio frequency signals of differing frequencies from a transmitter station to a receiver station, comprising:
    (a) a plurality of modulated light sources in said transmitter station, each providing a light signal;
    (b) a plurality of radio frequency signal sources, each signal source having a different frequency signal modulating a respective light source;
    (c) a single major optical fiber of a given diameter having a solid core and outer cladding layer coupling the transmitter station to the receiver station for transmitting a mixed light signal comprised of the light signals from each light source;
    (d) a plurality of minor small diameter individual optical fibers each having a solid core and outer cladding layer and each being connected at one end to a respective one of said light sources, the other ends of said plurality of smaller diameter fibers being joined with adjacent like fiber ends in a plurality of input pairs providing a plurality of optical fiber Y-couplers, each Y-coupler having two optical fiber inputs butt jointed to one optical fiber output of a larger diameter than said inputs, each said light source being connected as one input of a first respective Y-coupler via one minor optical fiber, the larger diameter output optical fiber of each Y-coupler being connected as an input optical fiber of a subsequent Y-coupler having an output optical fiber of successively larger diameter than the associated pair of input fibers until only two outputs remain, said two outputs being connected to said major optical fiber having the largest diameter by a last Y-coupler; and
    (e) detector means located in said receiver station and operatively associated with said major optical fiber for detecting said plurality of different radio frequency signals from said mixed light signal.

2. The system according to claim 1 wherein said modulated light sources are light emitting diodes.

3. The system according to claim 1 wherein said modulated light sources are DH lasers.

4. A system according to claim 1 wherein said detector means is a photosensitive diode.

5. A system according to claim 1 wherein said detector means is a photomultiplier.

6. A system according to claim 1 wherein a matching oil is located in the region of the butt-joints to match the index of refraction of the input optical fibers with the output optical fiber.

7. The system according to claim 1 wherein said detector means includes a plurality of filters wherein each filter is tuned to the frequency of a respective one of said radio frequency signals, the outputs of said filters collectively producing the original RF signals.

8. The system according to claim 7 wherein said filters are coupled to said detector means via a power splitter and an amplifier.

9. The system according to claim 7 wherein said radio frequency signals are TV channels and wherein said filters each have a bandpass equal to a TV channel bandwidth.

* * * * *